United States Patent Office 3,258,441
Patented June 28, 1966

3,258,441
SOIL AND SLIP RESISTANT COATING
COMPOSITIONS
Gilbert J. McEwan, Webster Groves, Mo., and Richard
P. Beimler, Baltimore, Md., assignors to Monsanto
Company, a corporation of Delaware
No Drawing. Filed Aug. 30, 1961, Ser. No. 134,827
22 Claims. (Cl. 260—29.6)

Novel coating compositions comprising an aqueous medium containing an alkali stabilized colloidal silica and an interpolymer latex, the novel transparent films or coatings formed from the dried residues of such compositions, and fibrous cellulosic sheets having the aforementioned coatings or films adhered thereto were disclosed in our application for Letters Patent, Serial No. 57,395, filed in the United States Patent Office, September 21, 1960 and now abandoned, and assigned to the same assignee as the present application. The disclosure contained in the present application should be taken in conjunction with said application for Letters Patent, Serial No. 57,395 and considered as a continuation-in-part of said application, Serial No. 57,395.

The present invention relates to novel coating compositions useful for coating purposes and more particularly to novel compositions comprising an aqueous medium containing an alkali-stabilized colloidal silica and an interpolymer latex. The present invention further relates to compositions comprising an aqueous medium having dispersed therein an alkali-stabilized colloidal silica and a finely-divided interpolymerization product comprised of a monovinylidene aromatic hydrocarbon, an alkyl ester of acrylic or methacrylic acid and an ethylenically unsaturated carboxylic acid compound. The present invention also relates to compositions of the above-type in which the interpolymerization product contains an unsaturated nitrile as a partial replacement for any or all of the above-mentioned components of the interpolymerization product. This invention also relates to novel compositions which may be formed into, or are capable of forming, clear, continuous transparent films or coatings which have soil resistant and slip-resistant properties and which may also have moisture-vapor barrier properties. The present invention further relates to processes for producing such films or coatings which comprise the dried residue of the novel compositions of this invention. The present invention still further relates to fibrous cellulosic sheets having the aforementioned coatings or films adhered thereto.

In the coating of fibrous cellulosic sheets such as paper, paperboard, etc., a wide variety of film-forming substances and compositions have been employed. Thus, certain film-forming substances have been employed to improve the appearance of such sheets. Other film-forming substances have been employed to protect the printing on the fibrous cellulosic sheets from rubbing and smearing. Also, certain film-forming materials have been used to prevent the slipping and sliding of containers or bags fabricated from such cellulosic sheets. Again, certain film-forming materials have been employed to serve as moisture-vapor barriers to prevent the passage of moisture through the fibrous cellulosic sheets which are used in packaging moisture-susceptible materials. Such coating materials have included certain varnishes which prevent printing ink rub-off and synthetic or natural gums or adhesives which have slip resistant properties while wax coatings have generally been used on cellulosic sheets to prevent the passage of moisture therethrough. However, each of the aforementioned classes of materials is usually limited in performance to but one specific function and no film-forming or coating material has been available which provides films or coatings having two or all three of the above mentioned features although the need therefor has been long recognized and a coated fibrous cellulosic sheet having all of the aforedescribed properties incorporated herein has been sought for some time.

Moreover, satisfactory coating compositions preferably should be capable of drying to form continuous films at relatively low temperatures e.g. below 150° C., and, in addition, preferably should be stable and free of large particles and capable of use without further treatment.

It is one object of the present invention to provide novel coating compositions, and especially novel coating compositions which can be formed into films or coatings which are slip-resistant and soil-resistant, and preferably compositions which are also grain-free, stable, and free of large particles.

It is a particular object of this invention to provide novel compositions comprising colloidal silica and certain interpolymer latices which may include as one monomer an unsaturated nitrile, which compositions can be dried at low temperature to form grain-free, continuous films having the aforementioned properties.

It is another object of the present invention to provide novel compositions which can be formed into clear, continuous transparent films or coatings having soil-resistant, slip-resistant, and moisture-vapor barrier properties, and particularly films or coatings which additionally have abrasion-resistance and flexibility at normal temperatures of use.

It is also an object of the present invention to provide processes for producing such films or coatings.

It is still another object of this invention to provide fibrous cellulosic sheets having a continuous transparent coating adhered thereto, which coating has soil-resistance and slip-resistance.

Other objects and advantages of the present invention will become apparent from the following description and the appended claims.

The present invention provides novel compositions comprising an aqueous medium having dispersed therein an alkali-stabilized colloidal silica and an interpolymer or copolymer latex comprising the inter-polymerization product of a monovinylidene aromatic hydrocarbon, an alkyl ester of acrylic or methacrylic acid, and an ethylenically unsaturated organic carboxylic compound having at least one carboxyl group, for example, a copolymer latex containing a copolymer of from about 25% to about 65% by weight of an alkyl acrylate and from 15 to 0.5% by weight of an ethylenically unsaturated organic carboxylic compound containing from 3 to 9 carbon atoms, having at least 1 carboxyl group and copolymerizable therewith. The quantity of colloidal silica in such compositions is usually in the range of from about 8% to 30% of the composition and is also in the range of 10 to 500 parts by weight per 100 parts by weight of said copolymer in the composition. Suitable interpolymers are comprised of from about 25% to 65% by weight of a monovinylidene aromatic hydrocarbon from about 60% to 34.5% by weight of an alkyl acrylate or alkyl methacrylate and from about 15% to 0.5% by weight of an ethylenically unsaturated carboxylic compound having at least one carboxyl group and copolymerizable with the monovinylidene aromatic hydrocarbon and alkyl acrylate or methacrylate.

Such interpolymer or copolymer may also include, chemically combined or copolymerized therein in addition to the monomeric compounds described above, an unsaturated nitrile preferably a vinyl nitrile or vinylidene nitrile.

When the interpolymer or copolymer contains an unsaturated nitrile, such nitrile will generally replace a portion of the monovinylidene aromatic hydrocarbon and/or a portion of the alkyl ester of acrylic or methacrylic acid and/or a portion of the ethylenically unsaturated carboxylic compound, but preferably replaces a portion of such alkyl ester and a portion of such carboxylic compound.

Examples of such copolymers which have been found particularly suitable are copolymers of from about 25% to 60% by weight of monovinylidene aromatic hydrocarbon, preferably styrene, from about 60% to 35% by weight of an alkyl ester of acrylic or methacrylic acid, from 5% to 20% by weight of a copolymerizable ethylenically unsaturated carboxylic compound, having at least one carboxyl group and copolymerizable with the styrene and the alkyl ester of acrylic or methacrylic acid and from about 10% to about 3% by weight of an unsaturated nitrile, preferably a vinyl or vinylidene nitrile.

The compositions of this invention are essentially composed of a continuous water phase and a dispersed phase comprising colloidal silica and colloidal particles of the aforementioned copolymers. The water phase may have dissolved therein a dispersing or emulsifying agent and the catalyst used in the preparation of the copolymer. These compositions when formed into a liquid film or coating can be dried to provide a clear, continuous transparent film or coating which is highly resistant to soiling upon contact with dirt and which is also slip-resistant. By proper formulation of these compositions, it is also possible to obtain films or coatings which are additionally flexible, abrasion-resistant, and also resistant to the transmission of water or water-vapor.

The alkali-stabilized colloidal silica sols which may be employed in the preparation of the compositions of this invention to provide the colloidal silica dispersed phase may be prepared in a variety of well-known ways. Thus, they may be prepared from aqueous sodium silicate solutions by treatment with cation exchange resins operating on the hydrogen cycle thereby reducing the sodium to $SiO_2$ ratio of the original sodium silicate solution and providing a sol having an $SiO_2$ to $Na_2O$ ratio in the range of about 10:1 to 500:1. Such procedures are described in general and in greater detail in U.S. Patent No. 2,244,325 to Paul C. Bird granted June 3, 1941; U.S. Patent No. 2,457,791 to Vandeveer Voorhees granted January 4, 1949; U.S. Patent No. 2,573,743 to Henry S. Trail granted November 6, 1951; U.S. Patent No. 2,574,902 to Max F. Bechthold and Omar E. Snyder granted November 13, 1951 and U.S. Patent No. 2,577,485 to Joseph M. Rule granted December 4, 1951. Further, such silica sols may be prepared by dispersing silica hydrogels at elevated temperatures in the presence of an aqueous solution of small amounts of sodium hydroxide or an alkaline heat stable Aquasol, as described, for example, in U.S. Patent No. 2,375,738 to John F. White granted May 8, 1945, and U.S. Patent No. 2,572,578 to Henry S. Trail granted October 23, 1951, respectively. Moreover, the alkali-stabilized colloidal silica sols may be prepared by removing the organic diluent from an alkaline organo-Aquasol as described in U.S. Patent No. 2,515,949 to Vincent Di Maio granted July 18, 1950 to U.S. Patent No. 2,515,961 to Morris D. Marshall granted July 18, 1950 or by alkalizing an acidic organo-Aquasol and removing the organic diluent therefrom as described in the aforesaid Di Maio and Marshall patents or as described in U.S. Patent No. 2,515,960 to Morris D. Marshall granted July 18, 1950.

All of the silica sols prepared by the procedures referred to in the preceding paragraph may be used in the compositions of this invention. All of these sols are slightly alkaline, having a pH in the range of about 8.5 to 11.0, preferably about 8.5 to 10.5, and having an $SiO_2$ to $M_2O$ mol ratio, where M is an alkali metal in the range of about 10:1 to 500:1, and usually in the range of about 75:1 to about 200:1, more desirably a range of about 80:1 to about 300:1. These silica sols are also stable, in that they remain fluid, that is, do not gel for periods of about six months or longer at 20° C. at silica concentrations of about 20% by weight. However, depending upon the particular procedure used, stable silica sols up to 45% by weight of silica can be prepared. Silica sols containing from 5% to 45% by weight, preferably 15% to 40% by weight of colloidal silica may be generally used in the compositions of the present invention and such sols have an average ultimate particle size of less than 250 millimicrons and generally in the range of about 5 to 200 millimicrons. The preferred sols have an average particle size in the range of about 5 to 30 millimicrons, and more particularly a range of about 10 to 25 millimicrons. When it is desired to obtain transparent films from the compositions of this invention, it has been generally found desirable to employ silica sols in which the average particle size is below 100 millimicrons preferably 5–80 millimicrons, since silica sols containing larger average size particles tend to produce hazy or opaque films. Film transparency or opacity is also dependent on film thickness, that is thinner films are more transparent, all things being equal, than thicker films. All of these sols also contain essentially none or relatively small amounts of water-soluble inorganic salts usually sodium sulfate or sodium chloride, or both, which originate from the raw materials, for example, sodium silicate or sulfuric acid, employed in their manufacture. Usually, such sols will contain less than 1.5% for example, in the range of 0.2 to 1.5% by weight of such inorganic salts and, in most instances, the sols prepared from sodium silicate and cation exchange resins (for example, the process of the above Bird patent) or by dispersing silica hydrogen (for example, the process of the above White patent) will contain less than 1%, for example, in the range of 0.1 to 1% by weight of such inorganic salts.

The copolymer or interpolymer latices employed in the compositions of this invention comprise dispersions of the low molecular weight copolymers hereinbefore defined which dispersed copolymers may vary somewhat as to particle size but desirably have a particle size in the range of about 50 to 8,000 Angstroms. When the copolymers do not include an unsaturated nitrile, the dispersed copolymers preferably have a particle size in the range of from 100 to 400 Angstroms, and more preferably a range of from 150 to 200 Angstroms. When the copolymers include an unsaturated nitrile, the dispersed copolymers preferably have a particle size in the range of from 1,000 to 5,000 Angstroms. The optimum latices in so far as all around results are concerned, usually contain an anionic dispersing agent and are characterized in having a surface tension in the range of 40–60 dynes per centimeter, and a viscosity (Brookfield) of 600–800 centipoises at 25° C. and a specific gravity between 1.01 to 1.3.

The copolymers or interpolymers may be prepared from styrene or a wide variety of other monovinylidene aromatic hydrocarbons, including monomers such as alpha methyl styrene, parachlorostyrene, 2,4-dichlorostyrene, 2,5-dichlorostyrene, parabromostyrene, para-methylstyrene, alphamethyl-paramethylstyrene, meta-ethylstyrene, para-isopropylstyrene, vinyl naphthalene and the like. Mixtures of two or more such compounds may be employed if desired. However, the preferred monovinylidene hydrocarbon is styrene.

The acrylic or methacrylic alkyl esters used in preparing the copolymers employed in compositions of the present invention are alkyl acrylates or methacrylates wherein the alkyl group has from 1 to 20 carbon atoms. Of special utility, are alkyl acrylates or methacrylates wherein the alkyl group has from 4 to 20 carbon atoms. The copolymers or interpolymers which are preferably employed in the compositions of this invention may be prepared from a wide variety of acrylic and methacrylic alkyl esters including straight chain and branched chain aliphatic alcohols, and esters of these acids. Examples include those esters formed by esterifying acrylic or methacrylic acid with alcohols such as amyl alcohol, hexanol, 2-ethyl hexanol, octanol, 2-methyl pentanol, the oxo alcohol of isobutylene dimer, heptyl alcohol, 3-methyl heptyl alcohol, tridecyl alcohol, tetradecyl alcohol and the like. Mixtures of two or more such acrylic or methacrylic acid esters may be employed if desired.

The preferred acrylic or methacrylic acid alkyl esters used in preparing the copolymers employed in the compositions of the present invention, when the copolymers do not contain an unsaturated nitrile, are alkyl acrylates, or methacrylates wherein the alkyl group has from 1 to 8 carbon atoms. Of special utility are alkyl acrylates wherein the alkyl group has from 4 to 8 carbon atoms and octyl acrylate is particularly preferred.

When the copolymer is one which contains combined therein an unsaturated nitrile, the acrylic or methacrylic acid alkyl esters employed preferably are alkyl acrylates or methacrylates wherein the alkyl group has from 5 to 20 carbon atoms and 2-ethylhexyl acrylate or methacrylate and decyl acrylate are particularly preferred.

A large variety of unsaturated organic carboxylic compounds, usually containing from 3 to 9 carbon atoms and having at least one carbonxyl group may be copolymerized with styrene or the other aromatic monovinylidene hydrocarbons and the alkyl acrylates or methacrylates in forming the aforedescribed copolymers. As examples of such unsaturated organic carboxylic compounds may be mentioned the ethylenically unsaturated aliphatic monocarboxylic acids such as alkenic monocarboxylic acids having from 3 to 6 carbon atoms as, for example, acrylic acid, butenic acids such as crotonic acid, isocrotonic acid, methyl acrylic acid and vinyl-acetic acid, and pentenic acids such as tiglic and angelic acids. In general the ethylenically unsaturated aliphatic monocarboxylic acids of the general formula $C_nH_{2n-2}O_2$, where $n$ is a whole number of from 3 to 6 and which are copolymerizable with styrene or the other monovinylidene aromatic hydrocarbons and alkyl acrylates and the methacrylate are useful in preparing the copolymers.

As further examples of such unsaturated organic compounds may be mentioned the ethylenically unsaturated organic polybasic carboxylic acids such as maleic anhydrides and maleic acid which are copolymerizable with styrene or other monovinylidene aromatic hydrocarbons and alkyl acrylate or metacrylate monomers, and also the relatively water-insoluble ethylenically unsaturated aliphatic dicarboxylic acids of which fumaric and itaconic acids are examples. Of these latter two fumaric acid is preferred because it is available commercially.

As further examples of unsaturated organic carboxylic compounds containing from 3 to 9 carbon atoms and having at least 1 carboxyl group may be mentioned the partial esters of ethylenically unsaturated aliphatic dicarboxylic acids which are copolymerizable with styrene or the other monovinylidene aromatic hydrocarbons and alkyl acrylate or methacrylate monomers, and preferably the alkyl half ester of such acids. As examples, of such partial esters may be mentioned the alkyl half esters of maleic acid in which the alkyl group contains from 1 to 4 carbon atoms, such as methyl, ethyl and propyl acid maleate; the alkyl half esters of fumaric acid in which the alkyl group contains from 1 to 4 carbon atoms such as methyl acid fumarate and secondary butyl acid fumarate; the alkyl half esters of citraconic acid, in which the alkyl group contains from 1 to 4 carbon atoms such as methyl and butyl citroconates; alkyl half esters of chloromaleic acid in which the alkyl group contains from 1 to 4 carbon atoms, such as ethyl and butyl acid chloromaleates; and alkyl half esters of itaconic acid in which the alkyl group contains from 1 to 4 carbon atoms, such as methyl and butyl acid itaconates and the like. These esters, with the exception of the alkyl acid itaconates are represented generally by the structural formula:

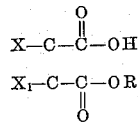

wherein X is hydrogen, halogen (preferably chlorine) or an alkyl group having at most a number of carbon atoms such that the total number of carbon atoms in the ester does not exceed 9, and where $X_1$ is the same as X or is preferably hydrogen and wherein X is other than hydrogen, and where R is an alkyl group having 1 to 4 carbon atoms. It is to be understood that the foregoing structural formula for the esters is intended to include the cis- and trans-forms of the esters. Of the above esters, the alkyl half esters of maleic acid are preferred because they are readily prepared from commercially available alcohols and commercially available maleic anhydride. Of the half esters, the methyl half ester of maleic acid is preferred for preparing copolymers with styrene and alkyl acrylates for use in the compositions of this invention.

It is to be understood that the copolymers described herein may comprise styrene, mixtures of alkyl acrylates in which the alkyl groups have less than 9 carbon atoms and the unsaturated acids hereinbefore described, for example, copolymers of styrene, alkyl acrylates having less than 9 carbon atoms, crotonic acid and alkyl half esters of maleic acid in which the alkyl group contains between 1 to 4 carbon atoms, copolymers of styrene, alkyl acrylates, crotonic acid, acrylic acid, and the like.

When the copolymers employed in the compositions of this invention include unsaturated nitriles it is preferred to use, as the ethylenically unsaturated carboxyl containing co-monomer, an unsaturated monocarboxylic acid including, for example, acrylic acid, methacrylic acid, cinnamic acid, crotonic acid, atropic acid and the like. The unsaturated nitriles which may be employed in the latices are vinyl or vinylidene nitriles and include acrylonitrile and methacrylonitrile. A mixture of unsaturated nitriles such as acrylonitrile with methacrylonitrile or a mixture of two or more of the unsaturated monocarboxylic acids may also be used if desired.

The preferred copolymers of this invention (when the unsaturated nitriles are not incorporated therein) from the standpoint of proportions of ingredients are copolymers of from 30% to 48% by weight of styrene or other monovinylidene aromatic hydrocarbons from 69.5 to 38% by weight of alkyl acrylate or methacrylate and from 0.5% to 14% by weight of the unsaturated organic carboxylic compounds hereinbefore described. When the above-described unsaturated nitriles are incorporated, the preferred proportions are from 40 to 60% by weight of styrene or another monovinylidene aromatic hydrocarbon from 45 to 35% by weight of alkyl acrylate or alkyl methacrylate, from 5% to 2% of the ethylenically unsaturated organic monocarboxylic compound and from 10% to 3% by weight of unsaturated nitrile. The preferred copolymers (which do not contain an unsaturated nitrile) of this invention from the standpoint of molecular weight are copolymers which have a molecular weight such that an aqueous latex containing 40% by weight of copolymers in the form of discrete particles having a particle size in the range of 150–250 Angstroms, a specific gravity of 1.01 at 25° C. and a viscosity (Brookfield) of between 600 and 800 centipoises at 25° C. Where the copolymer includes an unsaturated nitrile the particles size of the copolymer particles preferably is in the range of from about 1,000 to 5,000 Angstroms, although the specific gravity and viscosity will be substantially the same as for the copolymers described in the preceding sentence.

The copolymers or interpolymers of this invention may be prepared by various processes well known to those skilled in the art. In the examples hereindescribed, certain copolymers or interpolymers were prepared according to the following procedures.

Three hundred seventy parts by weight of a mixture comprising 40% by weight of styrene, 58% by weight of octyl acrylate, and 2% water were placed in a suitable reactor equipped with agitator and a nitrogen inlet. There was also added 350 parts by weight of a 2.2% aqueous solution of sodium lauryl sulfate, 0.04 part by weight of $FeSO_4$—$9H_2O$ and 0.7 part by weight of 30% hydrogen peroxide.

Reaction is initiated by stirring at a temperature of about 40° C. to 50° C. after sweeping out all of the air from the apparatus and, once started, is allowed to proceed at a steady temperature of about 30° C. At the same time, there is added steadily at the rate of about 6 to 8 parts by weight per hour for 18–22 hours a monomer mixture of 17% octyl acrylate, 74% styrene, 8% of the methyl half ester of maleic acid and 1% water together with additional emulsifying liquid consisting of 10% sodium lauryl sulfate solution, at about 5 parts by weight per hour, the total additions consisting of about 140 parts by weight of monomer and 100 parts by weight of emulsifier. About 15 hours after the start of the reaction, the temperature is raised to 40° C., and after all the monomer is added the temperature is raised to about 60° C. and the reaction mixture heated for an additional period of about 2 hours, having added additionally 0.5 part by weight of hydrogen peroxide catalyst. If desirable there may be added an additional amount of aqueous dispersing agent such as 12% sodium lauryl sulfate solution depending upon whether a more or less viscous dispersion is desired. The product, prepared as described, is a latex containing the polymer of a mixture comprising 48% styrene, 50% octyl acrylate and 2% of the methyl half ester of maleic acid.

A specific example of a latex especially suitable for use in the coating or film-forming compositions of the present invention is a styrene-acrylic latex composed of a copolymer of styrene, octyl acrylate and one of the copolymerizable, ethylenically unsaturated organic carboxylic acid compounds herein described, specifically a methyl, ethyl, or butyl acid (or half) ester of maleic acid.

Where the interpolymer or copolymer latices include an unsaturated nitrile, such copolymers may be prepared by the processes described in U.S. Patent 2,767,153 granted October 16, 1956, to Ernest A. Sutton, assigned to Monsanto Chemical Co.

Thees latices may also generally be obtained by interpolymerizing the monomer components within a certain hereinbefore specified range of proportions. The unsaturated ester usually comprises about 35–60% by weight of the total monomer charge, the unsaturated nitrile generally comprises 3–10% by weight of the total monomer charge, the unsaturated monocarboxylic acid usually comprises about 2–5% by weight of the total monomer charge and the remainder of the monomer charge i.e. 60–25% by weight is usually comprised of the monovinylidene hydrocarbon. Latices prepared by interpolymerizing the monomeric components in the above proportions will, when employed in certain compositions of this invention, provide compositions which will dry to form continuous films at a temperature of about 10° C. or less. In a preferred latex about 35–45% by weight of unsaturated ester, 3–10% by weight of unsaturated nitrile, 3–5% by weight of unsaturated monocarboxylic acid and 60–40% by weight of monovinylidene aromatic hydrocarbon may be interpolymerized to form latices which, when employed in the compositions of this invention will provide compositions which will dry to form continuous films at a temperature as low as 5.0° C. or less.

In the film-forming or coating compositions of this invention the quantity of colloidal silica as $SiO_2$ will be in the range of 8% to 30% by weight and preferably in the range of about 10% to 15% by weight. Additionally, the amount of colloidal silica as $SiO_2$ will be in excess of 10 parts by weight per 100 parts by weight of any of the aforedescribed copolymers present in the compositions of this invention, and preferably in the range of about 25 parts to 250 parts by weight of $SiO_2$ per 100 parts by weight of a particular copolymer. If the amount of $SiO_2$ is below 10 parts per 100 parts by weight of the copolymer, the films formed from such compositions will exhibit little if any soil resistant properties and will often be tacky. In general the upper limit of colloidal silica as $SiO_2$ will be about 500 parts by weight per 100 parts by weight of the copolymer. If such limit is exceeded the films formed will tend to be discontinuous and such films generally do not have good resistance to water penetration and do not act as moisture vapor barriers.

The compositions of this invention may be prepared in a variety of ways. For example, an aqueous latex of the copolymer can be added directly to the alkali-stabilized colloidal silica Aquasol and dispersed therein. When the finely-divided copolymer is added in the form of an aqueous latex, it is preferred that such latex have at least 40% by weight of the copolymer dispersed therein in order to avoid excessive dilution of the Aquasol.

The preferred film-forming or coating compositions of the present invention are characterized in having a total dispersed solids content comprised of a copolymer and $SiO_2$ of from between 30% and 40% preferably 32% to 37% by weight, a viscosity (Brookfield) of between 6 and 14, preferably between 7.5 and 12.5 centipoises at 25° C. and the dried coating produced from these compositions has a specific gravity of from 1.3 to 1.9, preferably from 1.5 to 1.7. These film-forming or coating compositions are further characterized in having a copolymer to $SiO_2$ weight ratio of from 4:1 to 1:4, preferably from 3:1 to 1:3. The film-forming compositions which are particularly preferred, from the standpoint of overall performance and versatility of the resulting coating, is a composition having a total solids content (comprised of one of the copolymers hereindescribed and $SiO_2$) of 34.6% by weight, wherein the weight ratio of copolymer to $SiO_2$ is about 1:1 and having a viscosity of 9.0 centipoises at 25° C. and a specific gravity of 1.82.

The film-forming compositions of this invention can be employed for coating a wide variety of cellulosic sheet materials such as wood, plywood, paper and the like by spraying, brushing, or rolling. The coating applied to the fibrous sheet may be dried in various ways as, for example, by exposure to ambient room temperatures. However, it is generally preferred (particularly in compositions where the interpolymer does not contain an unsaturated nitrile) to heat dry the coating and such heat drying may be carried out, for example, by heating an applied composition at a temperature in the range of from 50° C. to 150° C. In compositions in which the interpolymer contains an unsaturated nitrile such compositions may generally be readily dried at room temperatures e.g. 20–30° C. Of the fibrous cellulosic sheet materials, paper is preferred and by the term "paper" as used herein and in the appended claims is meant matted or felted sheets of vegetable fibre formed on a fine screen from an aqueous suspension and includes cellulosic paper in its usual or ordinary sense, for example, writing paper, wrapping paper, book paper, building paper, as well as paper of any thickness which includes paper board, paste board, cardboard, fibreboard, corrugated board, boxboard, container board and the like whether sized or unsized. By the term "paper" as used herein and in the appended claims is also meant "paper" as defined on page 812, volume 9 of the Encyclopedia of Chemical Technology by Kirk and Othner, 1952, published by the Interscience Encyclopedia, Inc., Ithaca, N.Y.

The preferred compositions of this invention when applied to such cellulosic materials, provide coated cellulosic sheets which have excellent soil-resistance, slip-resistance, water and moisture vapor resistance, blocking and abrasion resistance as well as good flexibility and cleanability.

A further understanding of the compositions, products and processes of this invention will be obtained from the following specific examples which are intended to illustrate the invention but not to limit the scope

Example I

One hundred parts by weight of an aqueous latex containing about 60% of water and 40% of a finely-divided dispersed copolymer consisting of the interpolymerization product of a mixture of 48% styrene, 50% octyl acrylate and 2% of the methyl half ester of maleic acid and having an average particle size between 150 and 250 Angstroms, was added with agitation at room temperature (about 25° C.) to 133 parts by weight of an alkali-stabilized colloidal silica Aquasol having an $SiO_2$ content of 30% by weight, a pH of about 9.5, and $SiO_2:Na_2O$ weight ratio of about 150:1 and an average particle size of about 15 millimicrons and a sodium chloride content of about 0.11% by weight thereby forming a coating composition having a total solids content (comprised of the copolymer and $SiO_2$) of 34.6% by weight, a viscosity of 9.0 centipoises at 25° C., a specific gravity of 1.62 and wherein the copolymer and $SiO_2$ were present in weight ratio of 1:1.

A sheet of double faced corrugated board with B flute corrugations and a white outer liner was coated with the above composition on the outside, employing a laboratory coating machine to provide a dried film of a thickness of about 1 mil of the aforedescribed composition. The sheet was then removed from the machine and heated at 110° C. for about 10 minutes. The outside of the resulting sheet having the coating adhered thereto was characterized by excellent anti-soiling properties, high gloss, good scuff resistance and a clear continuous transparent finish. The coating did not reduce the tear strength of the corrugated board. The unused portion of the composition was labelled composition "A" and set aside for further evaluation as described in Example IV.

Example II

Two hundred twenty-five parts by weight of the latex described in Example I was added with agitation at room temperature to 100 parts by weight of the colloidal silica Aquasol described in Example I thereby forming a coating composition having a total solids content (comprised of the copolymer and $SiO_2$) of 36.4%, a viscosity of 12.5 centipoises at 25° C., wherein the specific gravity of the dried film was 1.32 and wherein the copolymer and $SiO_2$ were present in a weight ratio of about 3:1.

The above composition was then applied to one side of a bleached 100 lb. per ream kraft paper from an applicator roll as the paper passed at a rate permitting an even application of a film of the composition over the surface of the paper, after which the paper was continually passed through a drying zone of 100° C. The dried coated paper so obtained was characterized in having good resistance to soiling, high gloss, good anti-blocking properties, and a smooth, clear, continuous transparent finish. The paper, containing the film which had dried to a thickness of about 1 mil, was completely impermeable to water and turpentine when contacted with these materials for a period of 24 hours and was also substantially resistant to water-vapor penetration. The unused portion of this composition was labelled composition "B" and was set aside for further testing as hereinafter described in Example IV.

Example III

One hundred parts by weight of the latex described in Example I was added with agitation at room temperature to 400 parts by weight of the colloidal silica Aquasol of Example I to provide a composition having a total solids content (comprised of the copolymer and $SiO_2$) of 32.5% by weight, a viscosity of 7.5 centipoises at 25° C., wherein the specific gravity of the dried film was 1.85 and wherein the weight ratio of copolymer to silica was a weight ratio of 1:3.

The above-described composition was applied to a sheet of double faced corrugated board with B flute corrugations and dried as in Example I. The resulting sheet was characterized by good anti-soiling properties, high gloss, good slip-resistance and a smooth clear transparent film of a thickness of about 1 mil. The coating did not reduce the tear strength of the corrugated board.

The remainder of the above-described composition was labelled composition C and set aside for further evaluation as described in Example IV.

Example IV

Coatings prepared from compositions A, B and C (described in Examples I–III, respectively) were evaluated for anti-soiling properties as follows:

Each composition was applied to a bleached kraft sheet at a rate permitting an even application of each over the surface of the sheet to which it was applied. The three sheets were then dried at 110° C. for 10 minutes.

Each of the three dried, coated sheets containing the dried residue of compositions A, B, and C, respectively, were placed in turn in a closed box containing an air line at one end, which air line was equipped with a 200 mesh screen covering its orifice. Approximately 0.7 gram of synthetic soil (prepared as described on page 156 of volume 27 of the Journal of the American Oil Chemists Society, May 1950) was injected into the air line and 8 pounds of pressure was intermittently turned on and off permitting the soil to be blown through the 200 mesh screen and into the side of the box. This procedure was repeated twice more at 5 minute intervals and the synthetic soil was allowed to settle out of the air and on to the sheets. Each sheet containing the coatings formed from the above-described compositions was removed from the box and subjected to a stream of air with a spray gun with a sweeping motion to remove the soil or dust which is not adhered to the respective coated sheets. The samples were then measured on a Gardner Automatic Color Difference Meter calibrated against a standard and having the following values:

| Rd | a |
|---|---|
| 7.3 | +61.5 |

The above instrument is a tristimulus colorimeter which measures color on three scales in order to determine (1) the color difference between two objects, or, (2) the color of an object relative to a standard. The reading of each coated sheet and an uncoated sheet is recorded before (reading clean) and after (reading dirty) the application and air removal of synthetic soil from the sheets.

The percent of soiling was calculated using the following equation:

$$\frac{\text{Reading Clean} - \text{Reading Dirty}}{\text{Reading Clean}} \times 100$$

The below listed data represent the average values obtained from triplicate determinations using the procedures described in this example.

| Sample coated with composition: | Soiling percent |
|---|---|
| A | 0.92 |
| B | 6.6 |
| C | 1.0 |
| Control | 16.2 |

In contrast to the foregoing, a varnish coated bleached kraft sheet exhibited a 29% soiling when subjected to the treatment and evaluation procedures of this example.

The dried films or coatings of compositions A through

C inclusive, are characterized in having excellent slip-resistance as will be seen from the following:

Example V

Duplicate sheets of double faced corrugated boxboard with B flute corrugations, having a patent white outer liner were coated with compositions A, B, and C, respectively, using the procedure described in Example I. Each sheet of coated boxboard had a coating of about 1 mil in thickness and was tested for slip-resistance as hereinafter described.

The following table shows the improvement in slip resistance of the treated corrugated boxboard sheets compared with an untreated control sheet.

| | Uncoated Control | Composition | | |
|---|---|---|---|---|
| | | A | B | C |
| Angle of Slip (degrees) | 19.0 | 38.8 | 42.0 | 37.6 |
| Percent Increase in Angle of Slip | 0 | 104.2 | 121.0 | 97.9 |

The angle of slip, which is a direct indication of slip-resistance is determined as follows:

An adjustable inclined plane having a fixed glass plate fastened thereto and equipped with an angle measuring scale is used as a testing device; a sheet of corrugated boxboard, either the control or one of the treated sheets, is fastened in a suitable manner to the fixed glass plate; and a second sheet of boxboard treated in the same manner is mounted on a glass plate which is free to slide on the fixed glass plate. This boxboard sheet and glass plate are mounted on the boxboard covered fixed glass plate when the latter is in a horizontal position and then weighted with a 150 gram weight. The angle of the inclined plane is gradually and slowly increased until the movable weighted boxboard begins to slide or move down the inclined plane. The angle so determined is the angle of slip. In carrying out the above tests, the glass plates of the testing device were covered with the same treated or untreated paper.

The dried films or coatings of compositions A through C inclusive are smooth, continuous, clear and transparent. They are further characterized in having high-gloss and good-abrasion or scuff-resistance. The coatings formed by compositions A and B are also highly resistant to water and water vapor penetration, a property heretofore not accompanied by coating compositions having anti-soil and anti-slip properties. Composition C is not as highly resistant to water and water vapor penetration. The coatings formed by compositions A and B also have excellent flexibility and such coatings are excellent for use when it is desired to fold or bend cellulosic sheets since the film will not break, crack or flake off of the treated cellulosic sheet.

Example VI

One hundred parts by weight of a stable homogeneous aqueous latex containing about 50% water and 50% of a finely divided dispersed copolymer consisting of the interpolymerization product of a mixture of 52% styrene, 40% 2-ethylhexyl acrylate, 2% methacrylic acid and 6% acrylonitrile and having an average particle size of between about 0.2 to 0.3 micron were added with agitation at room temperature (about 25° C.) to 133 parts by weight of the colloidal silica Aquasol described in Example I, thereby forming a coating composition having a total solids content (comprised of the copolymer and $SiO_2$) of 38.6%, a viscosity of 7.5 centipoises at 25° C. and a specific gravity of 1.14 wherein the copolymer and $SiO_2$ were present in a weight ratio of 1.25:1.

A sheet of double faced corrugated board with B flute corrugations and a white outer liner was coated with the above composition on the outside, employing a laboratory coating machine to provide a dried film of a thickness of about 1 mil of the aforedescribed composition. The sheet was then removed from the machine and permitted to dry at room temperature 25° C. The outside of the resulting sheet having the coating adhered thereto was characterized by excellent anti-soiling properties, high-gloss, good-scuff resistance and a clear continuous transparent finish. The coating did not reduce the tear strength of the corrugated board. An identical composition designated as composition D was further evaluated as described in Example IX.

Example VII

Two hundred twenty-five parts by weight of the latex described in Example I was added with agitation at room temperature to 100 parts by weight of the colloidal silica Aquasol described in Example I thereby forming a coating composition having a total solids content (comprised of the copolymer and $SiO_2$) of 41.8%, a viscosity of 13.5 centipoises at 25° C., wherein the specific gravity of the dried film was 1.36 and wherein the copolymer and $SiO_2$ were present in a weight ratio of about 3:1.

The above composition was then applied to one side of a bleached 100 lb. per ream kraft paper from an applicator roll as the paper passed at a rate permitting an even application of a film of the composition over the surface of the paper, after which the paper was continually passed through a drying zone of 100° C. The dried coated paper so obtained was characterized in having good resistance to soiling, high-gloss, good anti-blocking properties, and a smooth, clear, continuous transparent finish. The paper containing the film which had dried to a thickness of about 1 mil, was completely impermeable to water and turpentine and when contacted with these materials for a period of 24 hours and was also substantially resistant to water-vapor penetration. An identical composition designated composition E was evaluated as described in Example IX.

Example VIII

One hundred parts by weight of the latex described in Example I was added with agitation at room temperature to 400 parts by weight of the colloidal silica Aquasol of Example I to provide a composition having a total solids content (comprised of the copolymer and $SiO_2$) of 34.0% by weight, a viscosity of 8.7 centipoises at 25° C., wherein the specific gravity of the dried film was 1.79 and wherein the weight ratio of copolymer to silica was a weight ratio of 1:34.

The above-described composition was applied to a sheet of double faced corrugated board with B flute corrugations and dried as in Example I. The resulting sheet was characterized by good anti-soiling properties, high-gloss, good slip-resistance and a smooth, clear transparent film of a thickness of about 1 mil. The coating did not reduce the tear strength of the corrugated board.

An identical composition designated composition F was further evaluated as described in Example IX.

Example IX

Coatings prepared from compositions D, E, and F (described in Examples VI–VIII, respectively) were evaluated for antisoiling properties as described in Example IV.

The compositions were applied separately to bleached kraft sheets at a rate permitting an even application of each over the surface of the particular sheet to which they were applied. The three sheets were then dried at 110° C. for 10 minutes.

Each of the three dried, coated, sheets containing the dried residue of compositions D, E, and F, respectively, were placed in turn in a closed box containing an air line at one end, which air line was equipped with a 200 mesh screen covering its orifice. Approximately 0.7 gram of synthetic soil (prepared as described on page 156 of volume 27 of the Journal of the American Oil Chemists Society, May 1950) was injected into the air line and 8 pounds of pressure was intermittently turned on and off permitting the soil to be blown through the 200 mesh screen and into the side of the box.

The percent of soiling was calculated as described in Example IV.

The data listed below represent the average values obtained from triplicate determinations using the procedures described in this example.

Sample coated with
composition: Soiling, percent
D _____ 1.1
E _____ 5.0
F _____ 0.9
Control _____ 17.6

In contrast to the foregoing, a varnish coated bleached kraft sheet exhibited a 29% soiling when subjected to the treatment and evaluation procedures of the example.

The dried films or coatings of compositions D through F, inclusive are characterized in having excellent slip-resistance as will be seen from the following:

*Example X*

Duplicate sheets of double faced corrugated boxboard with B flute corrugations, having a patent white outer liner were coated with compositions D, E and F, respectively, using the procedure described in Example I. Each sheet of coated boxboard had a coating of about 1 mil in thickness and was tested for slip-resistance as hereinafter described.

The following table shows the improvement in slip-resistance of the treated corrugated boxboard sheets compared with an untreated control sheet.

| | Uncoated Control | Composition | | |
|---|---|---|---|---|
| | | D | E | F |
| Angle of Slip (degrees) | 18.5 | 37.8 | 43.1 | 36.9 |
| Percent Increase in Angle of slip | 0 | 104.3 | 132.9 | 99.4 |

The angle of slip, which is a direct indication of slip-resistance was determined as described in Example V.

The dried films or coatings of compositions D, through F inclusive, are smooth (yet slip resistant), continuous, clear and transparent. They are further characterized in having high-gloss and good-abrasion or scuff-resistance. The coatings formed by compositions A, D, and E, are highly resistant to water and water vapor penetration, a property heretofore not accompanied by coating compositions having anti-soil and anti-slip properties. Compositions C and F are not as highly resistant (as A, B, D, and E to water and water vapor penetration. The coatings formed by compositions A, B, D, and E also have excellent flexibility and such coatings are excellent for use when it is desired to fold or bend cellulosic sheets since the film will not break, crack or flake off of the treated cellulosic sheet. The coatings formed by compositions C and F were somewhat less flexible.

The evaluation procedures of Examples VI through X were repeated using 9 additional compositions in which the copolymer was varied by substituting acrylic acid for methacrylic acid, methacrylonitrile for acrylonitrile and decyl acrylate for 2-ethylhexyl acrylate with the amount of silica varied as in compositions D, E, A, and F. The dried films or coatings were substantially the same as those obtained from corresponding compositions D, E, and F, in other words all of the compositions exhibited excellent slip resistance and soil resistance when evaluated as above-described.

*Example XI*

Three separate compositions were prepared as follows: An alkali-stabilized colloidal silica Aquasol having an $SiO_2:Na_2O$ weight ratio of about 90:1, a sodium sulfate content of about 0.1% by weight and containing colloidal silica of an average particle size of about 40 millimicrons and the size of the colloidal silica particles was in the range of from 35 to 50 millimicrons was added to an aqueous latex containing about 53% water and 47% of a finely divided dispersed copolymer consisting of the interpolymerization product of a mixture of 52% styrene, 40% 2-ethylhexyl acrylate, 2% methacrylic acid and 6% acrylonitrile, the finely divided particles of the interpolymerization product having an average particle size of between 2,000 and 3,000 Angstroms, and the silica Aquasol and latex were mixed with agitation at room temperature (about 25° C.) in the proportions (parts by weight) listed below:

| Composition | G | H | I |
|---|---|---|---|
| Silica Aquasol, parts | 100 | 160 | 215 |
| Aqueous latex, parts | 260 | 100 | 100 |

The coating compositions so-produced had the following physical characteristics:

| Composition | Total Solids | Polymer/$SiO_2$ Ratio | Specific Gravity, 25° C. | Viscosity |
|---|---|---|---|---|
| G | 41.66 | 4.1 | 1.45 | 11.5 |
| H | 36.15 | 1.1 | 1.12 | 1.1 |
| I | 33.97 | 1.2 | 1.09 | 7.5 |

Films substantially uniform but varying thicknesses were cast from each of the above compositions on separate pre-weighed white, bleached kraft cardboard cards havin gan area of 400 sq. cm. The "loading" or weight of solids in the film, per unit area of cardboard, was determined by drying the cards overnight at ambient conditions, e.g. a relative humidity of from 50% to 60% and a temperature of from 25° C. to 30° C. and reweighing the treated or coated cards. The cardboard cards were then cut in half and evaluated for soiling employing the method described in Example IV, an untreated or "unsoiled" half serving as a control. The results are summarized as follows:

| Kraft Cards | Loading, lbs. solids per 1,000 ft. cardboard | Percent Soiling |
|---|---|---|
| Untreated | 0 | 24.0 |
| G | 0.81 | 3.5 |
| G | 6.08 | 0.9 |
| H | 2.37 | 2.7 |
| H | 5.21 | 1.1 |
| I | 1.28 | 3.5 |
| I | 8.14 | 0.0 |

Little or no change in the anti-soiling properties was observed when cards having the dried coatings of the various compositions were rinsed in a stream of distilled water and were then allowed to dry prior to soiling.

Coated kraft cardboard cards prepared as described above were also evaluated for slip-resistance using a Conbur impact tester, Model N–STIC developed by the Freight Container Bureau, Association of American Railroads and manufactured by the Ortman McCain Co., 1330 West Washington Blvd., Chicago 7, Illinois. The instrument consists of an inclined (30°) plane about 24 inches in length and with a rolling dolly, the plane being back-stopped at the bottom of the incline. The dolly is equipped with a flat 9" x 2" surface on which a piece of paper board or cardboard, to be tested, is attached. On top and at the upper end of this surface is placed another piece (4" x 2") of the sample which is attached to a standard weight-block.

In operating the instrument, the dolly is pulled a specified distance, e.g. 15 inches, up the inclined plane and released. When the dolly hits the backstop at the bottom of the inclined plane, an impact is produced and the top sample attached to the weight-block slides along the bottom sample. The distance of this slide affords a relative or comparative measure of the coefficient of friction and therefore the slip- or skid-resistance.

Because the slipperiness of any paper surface is affected by its moisture content all samples were stored in a cabinet, which was maintained at a relative humidity of 50% and a temperature of 73° F., for a 24 hour period before testing.

Bleached kraft cardboard coated with the compositions H and I were evaluated at various film thickness and compared with untreated controls and exhibited excellent slip-resistance as indicated below.

| Kraft Cards | Loading, lbs. solids per 1,000 ft. cardboard | Inches of Slide |
|---|---|---|
| Untreated | | 4 |
| Untreated | | 4 |
| G | 1.13 | 1.6 |
| G | 8.47 | 0.8 |
| H | 0.75 | 2.1 |
| H | 1.02 | 2.7 |
| I | 1.28 | 1.3 |
| I | 8.14 | 1.9 |

Film clarity of films of various thicknesses formed from compositions G, H, and I, was observed by casting films on blue jute cardboard (liner board). In these experiments the film thickness was calculated from the loading ($ld$), and the average density of the solids ($da$) (where the density of interpolymer solids was 1.042 gm./ml. and the density of the silica solids in 2.2 gms./ml.) and the following formula was employed.

$$\text{Film thickness (inches)} = ld\left(\frac{\text{gm.}}{\text{in.}^2}\right) \times \frac{ld}{\text{gm.}} \left(\frac{ld}{\text{gm.}}\right) \times \frac{ld}{\text{spec. gravity of liquid composition}}$$

| Composition | Film Thickness (In.) | Clarity |
|---|---|---|
| G | .0032 | Slight haze but transparent. |
| G | .0050 | Cloudy and transparent. |
| H | .0032 | Clear and transparent. |
| H | .0050 | Slight haze but transparent. |
| I | .0032 | Do. |
| I | .0050 | Cloudy and transluscent. |

Water penetration was evaluated by placing approximately 1 ml. of distilled water on .0032 in. thick films of the above compositions which were then permitted to dry. The films from composition H showed no penetration of the film by the water. The film of compositions G and I indicated that a slight amount of penetration of the film by the water had occurred.

What is claimed is:

1. A composition of matter, useful in making a soil-resistant and slip-resistant coating, consisting essentially of an aqueous liquid phase having dispersed therein colloidal particles of an alkali-stabilized colloidal silica and finely divided particles having a particle size in the range of about 50 to 8,000 Angstroms of an interpolymerization product of (1) from about 25% to 65% by weight of a monovinylidene aromatic hydrocarbon, (2) from about 60% to about 34.5% by weight of an alkyl ester of an unsaturated acid selected from the group consisting of acrylic acid and methacrylic acid and (3) from about 15% to 0.5% by weight of an ethylenically unsaturated organic carboxylic compound having at least one carboxyl group and copolymerizable with said monovinylidene aromatic hydrocarbon and said alkyl ester; the quantity of colloidal silica particles, as $SiO_2$, being in the range of 10 to 500 parts by weight per 100 parts by weight of said copolymer particles.

2. A composition of matter, useful in making a soil-resistant and slip-resistant coating, consisting essentially of an aqueous liquid phase having dispersed therein colloidal particles of an alkali-stabilized colloidal silica and finely divided particles having a particle size in the range of about 50 to 8,000 Angstroms of a copolymer consisting essentially of the interpolymerization product of (1) from about 25% to 65% by weight of a monovinylidene aromatic hydrocarbon, (2) from about 60% to 35% by weight of an alkyl ester of an unsaturated acid selected from the group consisting of acrylic acid and methacrylic acid, (3) from about 5% to 20% by weight of an ethylenically unsaturated organic carboxylic acid compound having at least one carboxyl group and copolymerizable with said monovinylidene aromatic hydrocarbon and said alkyl ester and (4) from about 10% to 3% by weight of an unsaturated nitrile; the quantity of colloidal silica as $SiO_2$ being in the range of from 10 to 500 parts by weight per 100 parts by weight of said copolymer.

3. A composition of matter, useful in making a soil-resistant and slip-resistant coating, consisting essentially of a continuous water phase having colloidal particles of alkali-stabilized colloidal silica dispersed therein, said colloidal silica being characterized in having an $SiO_2$ to $Na_2O$ weight ratio of about 10:1 to about 500:1 and an average particle size of about 5 to 100 millimicrons, and said water phase also containing, as a dispersed phase, finely divided particles of a copolymer of from 26% to 65% by weight of styrene, from 60.0% to 34.5% by weight of an alkyl acrylate having from 4 to 8 carbon atoms in the alkyl group and from 0.5% to 14% by weight of a copolymerizable ethylenically unsaturated organic carboxylic compound containing from 3 to 9 carbon atoms and having at least one carboxyl group, said copolymer particles being characterized in having an average particle size of between 150 to 250 Angstroms; the quantity of colloidal silica particles in said composition being in the range of from about 25 to 250 parts by weight of $SiO_2$ per 100 parts by weight of said copolymer particles; said composition being further characterized in having a viscosity of 7.5 to 12.5 centipoises at 25° C.

4. The composition of claim 3 wherein the ethylenically unsaturated carboxylic compound is crotonic acid.

5. The composition of claim 3 wherein the ethylenically unsaturated carboxylic compound is acrylic acid.

6. The composition of claim 3 wherein the ethylenically unsaturated carboxylic compound is methacrylic acid.

7. The composition of claim 3 wherein the ethylenically unsaturated carboxylic compound is an alkyl half ester of maleic acid having from 1 to 4 carbon atoms in the alkyl group.

8. A composition of matter, useful in making a soil-resistant and slip-resistant coating, consisting essentially of a continuous water phase having colloidal particles of an alkali-stabilized colloidal silica dispersed therein, said colloidal silica being characterized in having an $SiO_2$ to $Na_2O$ weight ratio of about 80:1 to about 300:1 and an average particle size of about 5 to 80 millimicrons, and said water phase also containing, as a dispersed phase, particles of a finely divided copolymer of about 30% to 48% by weight of styrene, from 69.5% to 38.0% by weight of octyl acrylate and from 0.5% to 14% by weight of crotonic acid, said copolymer being characterized in having an average particle size of between about 150 to 250 Angstroms; the quantity of colloidal silica particles in said composition being in the range of from about 25 to 250 parts by weight of $SiO_2$ per 100 parts by weight of said copolymer particles; said composition being characterized in having a viscosity of 7.5 to 12.5 centipoises at 25° C.

9. A composition of matter, useful in making a soil-resistant and slip-resistant coating, consisting essentially of a continuous water phase having colloidal particles of alkali-stabilized colloidal silica dispersed therein; said colloidal silica being characterized in having an $SiO_2$ to $Na_2O$ weight ratio of about 10:1 to about 500:1 and an average particle size of about 5 to 100 millimicrons and said water phase also containing, as a dispersed phase, finely divided particles having particles in the size range of from about 1,000 to 5,000 Angstroms copolymer of from about 25% to 60% by weight of styrene, from about 60% to 35% by weight of an alkyl ester of acrylic acid containing from 5 ot 20 carbon atoms in the alkyl group, from about 5% to 2% by weight of a copolymerizable ethylenically unsaturated carboxylic compound containing from 3 to 9 carbon atoms and having at least one carboxyl group, and from about 10% to 3% by weight of an unsaturated nitrile selected from the group consisting of vinyl nitrile and vinylidene nitrile, the quantity of colloidal silica particles being in the range of from about 25 to 250 parts by weight of $SiO_2$ per 100 parts by weight of said copolymer particles.

10. The composition of claim 9 wherein the ethylenically unsaturated carboxylic compound is acrylic acid.

11. The composition of claim 9 wherein the ethylenically unsaturated carboxylic compound is methacrylic acid.

12. The composition of claim 9 wherein the ethylenically unsaturated carboxylic compound is crotonic acid.

13. The composition of claim 9 wherein the ethylenically unsaturated carboxylic compound is an alkyl half ester of maleic acid in which the alkyl group contains from 1 to 4 carbon atoms.

14. A composition of matter, useful in making a soil-resistant and slip-resistant coating, consisting essentially of a continuous water phase having colloidal particles of alkali-stabilized colloidal silica dispersed therein, said colloidal silica being characterized in having an $SiO_2$ to $Na_2O$ weight ratio of about 80:1 to 300:1 and an average particle size of about 5 to 80 millimicrons and said water phase also containing, as a dispersed phase, finely-divided particles of a copolymer of about 40% to 60% by weight of styrene, about 45% to 35% by weight of 2-ethylhexyl acrylate, from 5% to 2% by weight of methacrylic acid, and from about 10% to 3% by weight of acrylonitrile, said copolymer being characterized in having an average particle size of from about 1,000 to 5,000 Angstroms; the quantity of colloidal silica particles in said composition being in the range of from about 25 to 250 parts by weight per 100 parts by weight of said copolymer particles; said composition being characterized in having a viscosity of about 7.5 to 12.5 centipoises at 25° C.

15. The method which comprises applying to the surface of a fibrous cellulosic sheet the composition of claim 1.

16. The method which comprises applying to the surface of a fibrous cellulosic sheet the composition of claim 2.

17. The method which comprises applying to the surface of a felted cellulosic paper a continuous liquid coating of the composition of claim 8 and thereafter drying said coating.

18. The method which comprises applying to the surface of a felted cellulosic paper a continuous liquid coating of the composition defined in claim 14 and thereafter drying said coating.

19. A fibrous cellulosic sheet having an adherent soil-resistant and slip-resistant coating comprising the dried product of the composition of claim 1.

20. A fibrous cellulosic sheet having an adherent soil-resistant and slip resistant coating comprising the dried product of the composition of claim 2.

21. A felted cellulosic paper having an adherent soil-resistant and slip-resistant coating comprising the dried product of the composition of claim 8.

22. A felted cellulosic paper having an adherent continuous soil-resistant and slip-resistant coating comprising the dried product of the composition of claim 14.

References Cited by the Examiner

UNITED STATES PATENTS

| | | | |
|---|---|---|---|
| 2,753,318 | 7/1956 | Maeder | 260—29.6 |
| 2,760,941 | 8/1956 | Iler | 260—29.6 |
| 2,918,391 | 12/1959 | Hornibrook | 260—29.6 |
| 3,037,881 | 6/1962 | McDowell | 260—29.6 |
| 3,069,375 | 12/1962 | Bullitt et al. | 260—29.6 |

MURRAY TILLMAN, *Primary Examiner.*

LEON J. BERCOVITZ, *Examiner.*

H. L. SATZ, W. J. BRIGGS, SR., *Assistant Examiners.*

UNITED STATES PATENT OFFICE
CERTIFICATE OF CORRECTION

Patent No. 3,258,441                                                        June 28, 1966

Gilbert J. McEwan et al.

It is hereby certified that error appears in the above numbered patent requiring correction and that the said Letters Patent should read as corrected below.

Column 2, line 46, after "weight" insert -- of styrene, from about 60% to about 34.5% by weight --; column 14, in the second table, third column, lines 1 to 3 thereof, for "4.1" "1.1" "1.2" read -- 4:1 --, -- 1:1 --, -- 1:2 --; same table, fifth column, line 2 thereof, for "1.1" read -- 11.1 --.

Signed and sealed this 24th day of October 1967.

(SEAL)
Attest:

Edward M. Fletcher, Jr.                                EDWARD J. BRENNER
Attesting Officer                                            Commissioner of Patents